(12) United States Patent
Stiff

(10) Patent No.: US 9,061,179 B2
(45) Date of Patent: Jun. 23, 2015

(54) CUSTOMIZABLE EYEWEAR

(75) Inventor: Craig Stiff, Redondo Beach, CA (US)

(73) Assignee: WARNACO SWIMWEAR, INC., Los Angeles, CA (US)

( * ) Notice: Subject to any disclaimer, the term of this patent is extended or adjusted under 35 U.S.C. 154(b) by 995 days.

(21) Appl. No.: 12/782,884

(22) Filed: May 19, 2010

(65) Prior Publication Data

US 2011/0283445 A1    Nov. 24, 2011

(51) Int. Cl.
*A41F 9/00* (2006.01)
*A63B 33/00* (2006.01)
*G02C 11/02* (2006.01)

(52) U.S. Cl.
CPC .............. *A63B 33/002* (2013.01); *G02C 11/02* (2013.01); *A63B 2208/12* (2013.01)

(58) Field of Classification Search
CPC ............................................ G02C 11/00–11/02
USPC ........................... 2/440, 442; 351/51, 52, 121
See application file for complete search history.

(56) References Cited

U.S. PATENT DOCUMENTS

| | | | | |
|---|---|---|---|---|
| 492,125 A * | 2/1893 | Warren | | 2/439 |
| 1,843,847 A * | 2/1932 | Sutton | | 2/439 |
| 2,835,063 A * | 5/1958 | Worthington | | 351/52 |
| 2,842,028 A * | 7/1958 | Belgard | | 351/52 |
| 3,526,450 A * | 9/1970 | Berry | | 351/52 |
| 4,070,103 A * | 1/1978 | Meeker | | 351/52 |
| 4,405,212 A * | 9/1983 | Cooper | | 351/43 |
| 4,878,749 A * | 11/1989 | McGee | | 351/52 |
| 4,884,883 A * | 12/1989 | Chappell | | 351/52 |
| 4,958,923 A * | 9/1990 | Rosenson | | 351/52 |
| 5,181,051 A * | 1/1993 | Townsend et al. | | 351/52 |
| 5,321,442 A * | 6/1994 | Albanese | | 351/44 |
| 5,371,554 A * | 12/1994 | Aspesi | | 351/52 |
| 5,410,763 A * | 5/1995 | Bolle | | 2/436 |
| D367,286 S * | 2/1996 | Tabacchi | | D16/306 |
| 5,502,516 A * | 3/1996 | Elterman | | 351/47 |
| 5,642,177 A * | 6/1997 | Nishioka | | 351/47 |
| 5,980,036 A * | 11/1999 | Solomon | | 351/47 |
| 6,210,001 B1 * | 4/2001 | Huang | | 351/86 |
| 6,386,703 B1 * | 5/2002 | Huang | | 351/57 |
| 6,543,894 B1 * | 4/2003 | Shapiro | | 351/52 |
| 6,764,175 B1 * | 7/2004 | Chen | | 351/47 |
| 6,811,254 B2 * | 11/2004 | Ifergan | | 351/57 |
| 7,029,114 B2 * | 4/2006 | Smith | | 351/47 |
| 7,172,281 B2 * | 2/2007 | Chen | | 351/62 |
| 7,261,409 B1 * | 8/2007 | Taber et al. | | 351/52 |
| 7,278,733 B2 * | 10/2007 | Olney | | 351/62 |
| 2010/0107319 A1* | 5/2010 | Yudkin | | 2/426 |

OTHER PUBLICATIONS

Mexican Office Action dated Sep. 12, 2014 for the Corresponding Mexican Patent Application No. MX/a/2011/004936.

* cited by examiner

*Primary Examiner* — Danny Worrell
*Assistant Examiner* — Khaled Annis
(74) *Attorney, Agent, or Firm* — Katten Muchin Rosenman LLP

(57) ABSTRACT

A customizable eyewear for use in water recreational activities includes a main frame member having a first and a second opening and a support surface disposed on an outer surface adjacent to the respective first and second opening. The eyewear also includes a first and a second eyecup disposed in the respective first and second opening. The eyecups include a retention member and a receiving channel between the retention member and the support. An ornamental frame is removably received in the receiving channel.

19 Claims, 4 Drawing Sheets

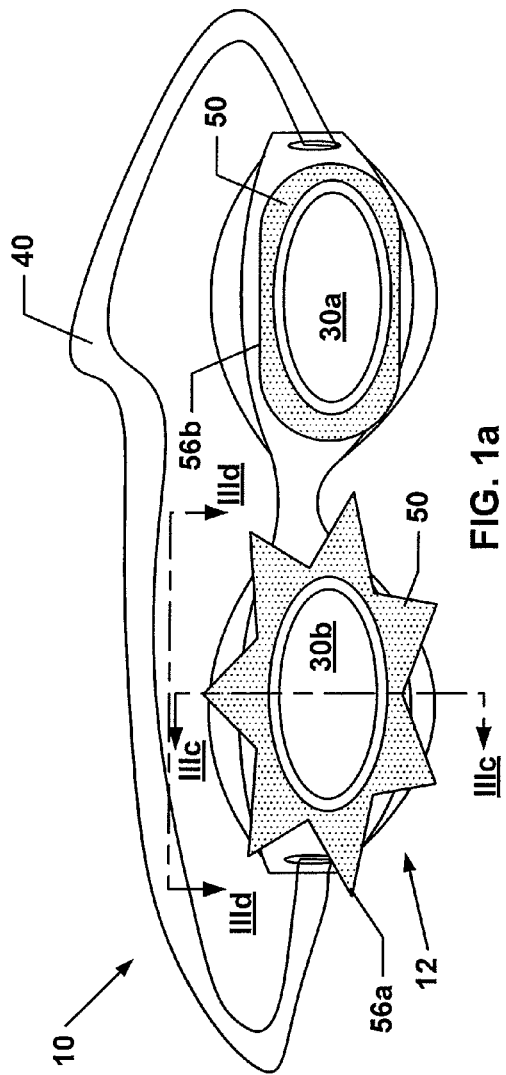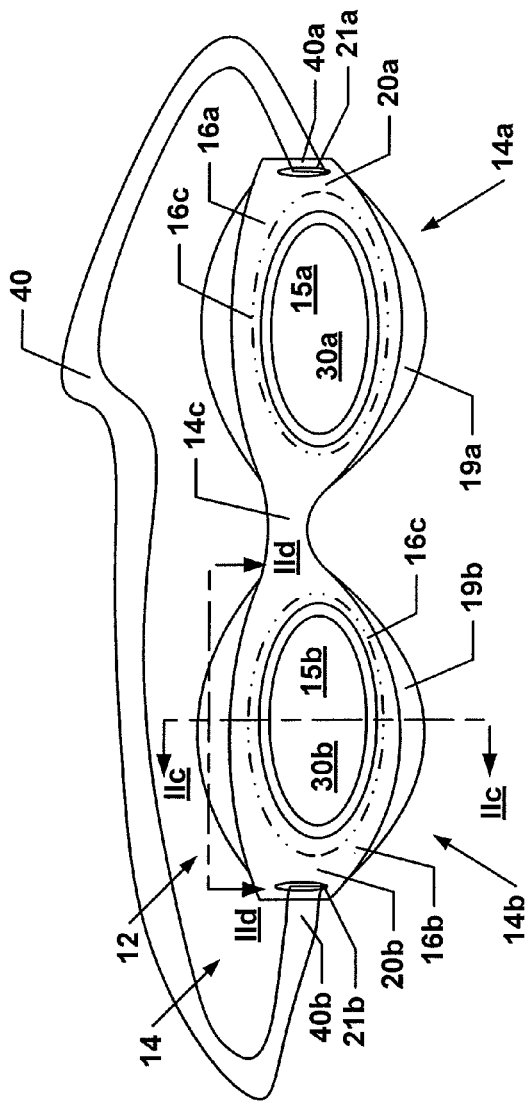

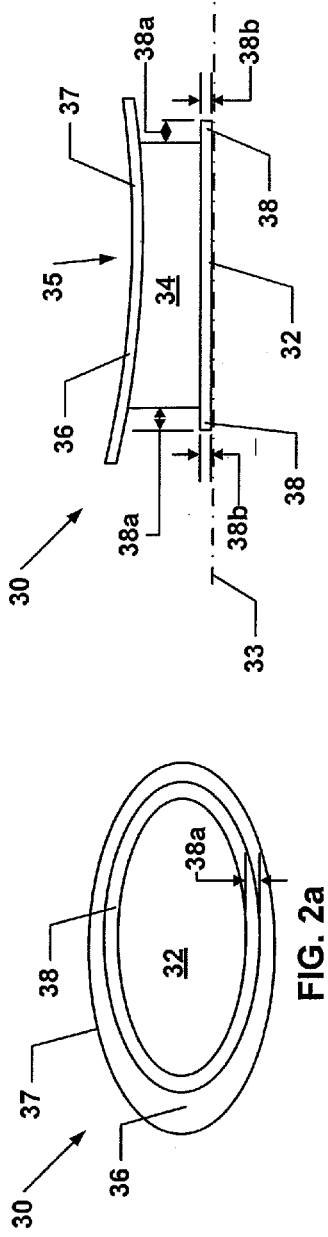
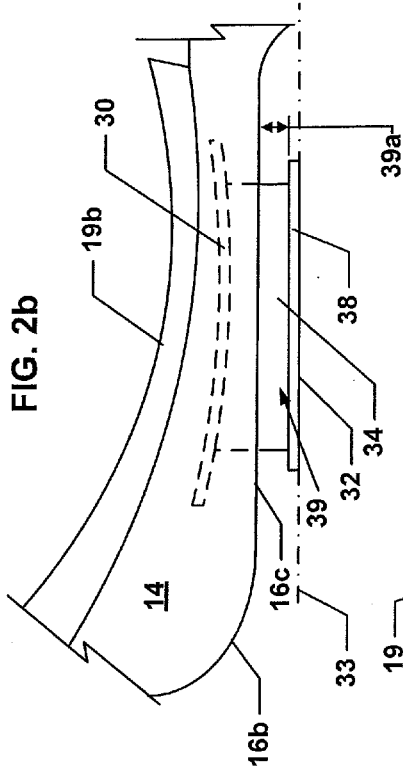
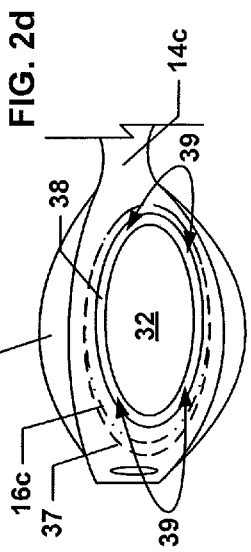
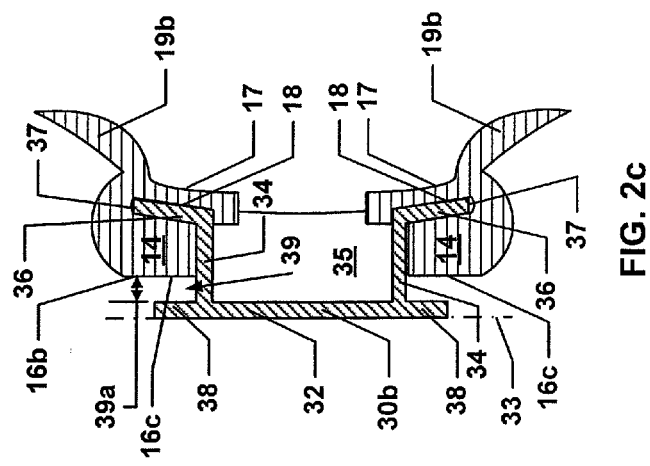

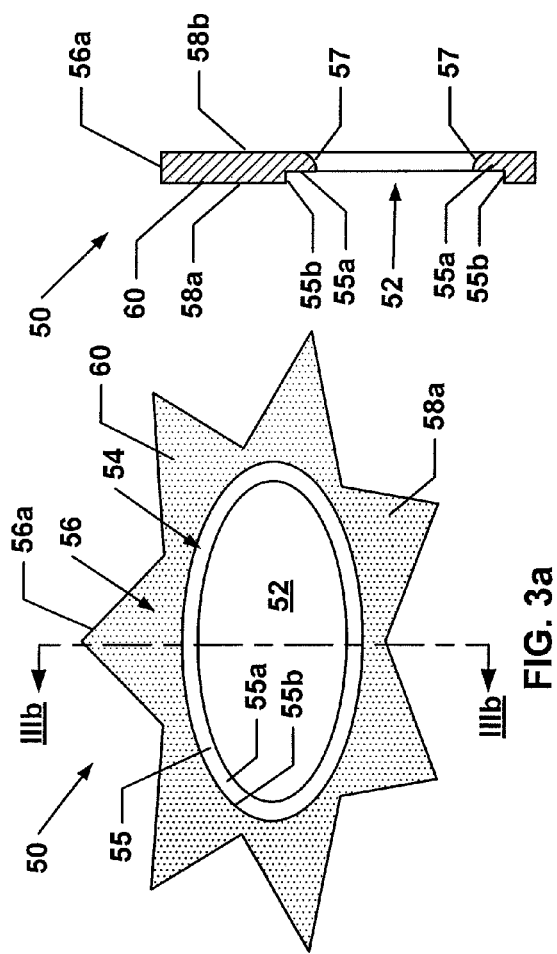
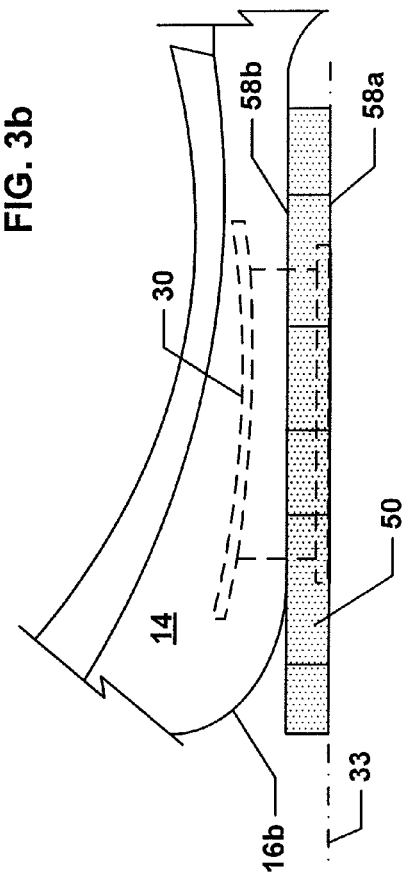
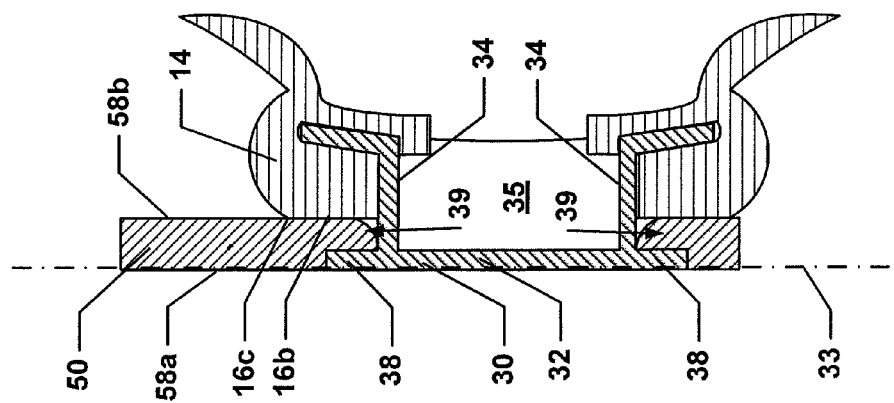
FIG. 3a
FIG. 3b
FIG. 3c
FIG. 3d

CUSTOMIZABLE EYEWEAR

BACKGROUND OF THE INVENTION

1. Field of the Invention

The present invention relates to customizable eyewear suitable for use in recreational water activities. In particular, the invention relates to swimming goggles used by children in a swimming pool and/or on a beach.

2. Description of the Related Art

Swimming goggles for children are usually made more attractive to the wearer by using color tones for the frame that children find interesting. Thus, swimming goggles having luminescent purple or bright orange proliferate on beaches and in the vicinity of swimming pools.

Although, attractive colors provide interest for children, it leaves the swimming goggle as a passive device worn when needed. To interest children or other users, what is needed is a device and/or means that permit customization of swimming goggle and that provide for interest by others.

SUMMARY OF THE INVENTION

These and other needs are met by the present invention. Therein, a customizable eyewear for use in water recreational activities includes a main frame member having a first and a second opening and a support surface disposed on an outer surface adjacent to the respective first and second opening. The eyewear also includes a first and a second eyecup disposed in the respective first and second opening. The eyecups include a retention member and a receiving channel between the retention member and the support. An ornamental frame is removably received in the receiving channel.

BRIEF DESCRIPTION OF THE DRAWINGS

FIG. 1a is a perspective view of a customizable eyewear in accordance with one or more embodiments of the present invention.

FIG. 1b is a perspective view of water protective device and the headstrap of the customizable eyewear of FIG. 1a.

FIG. 2a is a front view of an eyecup in accordance with one or more embodiments of the present invention.

FIG. 2b is a top view thereof.

FIG. 2c is a cross-sectional view of the eyecup of FIG. 2a and a main frame member, the section having been taken as indicated in FIG. 1b.

FIG. 2d is a top detail view of the eyecup of FIG. 2a and a portion of the main frame member, the detail having been taken as indicated in FIG. 1b.

FIG. 2e is a front view of the eyecup and the main frame member showing a supporting surface of the main frame member.

FIG. 3a is a front view of an ornamental frame in accordance with one or more embodiments of the present invention In accordance with one or more embodiments of the present invention.

FIG. 3b is a cross-sectional view of the ornamental frame of FIG. 3a.

FIG. 3c is a cross-sectional view of the ornamental frame of FIG. 3a and a main frame member and an eyecup, the section having been taken as indicated in FIG. 1a.

FIG. 3d is a top detail view of the ornamental frame of FIG. 3a and a portion of the main frame member, the detail having been taken as indicated in FIG. 1a.

FIG. 4b is a cross-sectional view of the ornamental frame of FIG. 4a.

DETAILED DESCRIPTION OF THE DRAWINGS

Figure 4B:
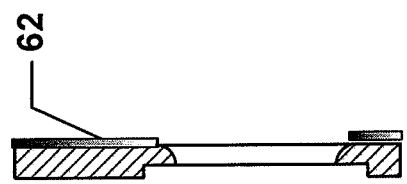

Reference will now be made in detail to several views of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

In accordance with one or more embodiments of the present invention, a fun-to-wear customizable eyewear comprises a water protective device and one or more ornamental frames that are removably mountable on the water protective device for user-engageable customization.

Herein, a water protective device means a swimming goggle (i.e., swim goggle), a swim mask, a diving mask, or like device that is oriented toward general recreational use and that in the ordinary course of its wear protects a wearer from the intrusion of pool water, water chlorination, and/or sea water. A water protective device excludes devices that have as a primary motivation the protection of the wearer from occupational injuries resulting from welding, deep sea diving, or the like or protection of the wearer from injuries while participating in high risk athletic activities such as deep sea diving, competitive skiing, bicycle racing, or motorcycling, because such devices typically comprise rigid framework structures.

FIG. 1a is a perspective view of a customizable eyewear in accordance with one or more embodiments of the present invention. FIG. 1b is a perspective view of the main frame member of the eyewear of FIG. 1a. In accordance with one or more embodiments of the present invention, a customizable eyewear 10 includes a water protective device 12 and an ornamental frame 50.

By way of example but not as a limitation, device 12 is configured as a swimming goggle. Device 12 comprises a main frame member 14, one or more eyecups 30, and a headstrap 40 to secure device 12 to a wearer.

Main frame member 14 is an extended member that conforms to and covers a front portion of the face at a position proximal to the eyes of the wearer. When device 12 is configured as swimming goggle, main frame member 14 may advantageously molded cost-effectively as a unitary flexible member from a flexible material that provides a cushioned feel when worn, such as a thermoplastic elastomer. By molding from a flexible material, the wearer's comfort is improved and wearers having different facial anatomies, such as size, may find that the same size device 12 fits comfortably. Additionally, molding permits main frame member 14 to cost-effectively comprise one or more colors that provide a base color tone to device 12.

Main frame member 14 comprises a left frame portion 14a, a right frame portion 14b, and a nose bridge 14c. The left and right frame portions 14a, 14b comprise respective openings 15a, 15b, outer surfaces 16a, 16b, and one or more inner surfaces 17.

A pair of receiving grooves 18 is disposed in the periphery of openings 15a, 15b between the inner and outer surfaces to retain respective eye cups 30a, 30b. A pair of gaskets 19a, 19b is formed on an inner surface 17 to comfortably seal the eye areas of the wearer from the water.

Each respective outer surface 16a, 16b includes a supporting surface 16c providing a support for the ornamental frame. Supporting surface 16c, i.e., support 16c, is disposed adjacent to openings 15a, 15b and is preferably substantially planar.

A pair of headstrap attachment sections 20a, 20b is disposed at outer sections frame portions 14a, 14b, respectively and includes one or more apertures 21a, 21b, respectively. Respective end sections 40a, 40b of headstrap 40 are fitted through apertures 21a, 21b to secure and attach the headstrap to main frame member 14.

Nose bridge 14c preferably is integrally molded, but may comprises a separate unit that is secured to respective attachment sections on inner sides of frame portions 14a, 14b, as is generally known in the art.

FIG. 2a is a front view of an eyecup in accordance with one or more embodiments of the present invention. FIG. 2b is a top view thereof. FIG. 2c is a cross-sectional view of the eyecup of FIG. 2a and a main frame member, the section having been taken as indicated in FIG. 1b. FIG. 2d is a top detail view of the eyecup of FIG. 2a and a portion of the main frame member, the detail having been taken as indicated in FIG. 1b. FIG. 2e is a front view of the eyecup and the main frame member showing a supporting surface of the main frame member.

One or more eyecups 30, i.e., eyecup 30a, 30b, may comprise any suitable material, but preferably is an inelastic or rigid injection moldable clear translucent or slightly tinted translucent plastic material onto which main frame member 14 is overmolded, as is generally known in the art.

Therein, eyecup 30 comprises and extended shape. Eyecup 30 includes a lens 32 having a preferably flat, planar surface 33. Lens 32 is preferably, provided in any suitable shape, such as an oval. A peripheral wall 34 extends from the lens at any suitable angle, but preferably is perpendicular to plane 33 or to any other convenient plane of the lens, and encloses the lens at least partially forming an inner space 35. Inner space is open toward the eye of a wearer, i.e., eye area of the wearer, and is typically proximate to an eye of the wearer and is kept dry by the watertight seal against wearer's eye area. Wall 34 may have a variable or a uniform height.

A rim portion 36, i.e., rim portions 36a, 36b, is disposed peripherally around wall 34 distal from the plane of the lens. The rim portion includes an edge 37, i.e., edges 37a, 37b, that is substantially perpendicular to wall 34. Respective edges 37a, 37b are received in receiving grooves 18a, 18b. Edges 37a, 37b may comprise notches to be secured in receiving grooves via overmolded extensions.

In accordance with one or more embodiments of the present invention, one or more eyecups 30, i.e., 30a, 30b, comprises a retention member 38 that is disposed in the same respective plane 33 as lens 32 and may be disposed peripherally about the lens or at least peripherally around a portion of the lens. Retention member 38 may have an extension 38a having a dimension of 1.5-3.0 mm from which it extends away from an outer surface of lens 32 and/or wall 34 and/or a thickness 38b having a dimension 0.75-1.5 mm. Extension 38a and thickness 38b are preferably disposed peripherally about the lens and/or wall and comprise their respective dimension uniformly. Retention member 38 may also be angled away from plane 33, preferably towards the wearer.

When eyecup 30 is joined to main frame member 14, a receiving channel 39 is formed between a rear surface of retention member 38 and respective outer surface 16a and/or 16b of main frame member 14. Receiving channel 39 is preferably formed peripherally about wall 34. The channel preferably has a receiving width 39a having a dimension of 1.0-4.0 mm and a height of receiving channel 39 that corresponds to the dimension of extension 38a.

FIG. 3a is a front view of an ornamental frame in accordance with one or more embodiments of the present invention. FIG. 3b is a cross-sectional view of the ornamental frame of FIG. 3a. FIG. 3c is a cross-sectional view of the ornamental frame of FIG. 3a and a main frame member and an eyecup, the section having been taken as indicated in FIG. 1a. FIG. 3d is a top detail view of the ornamental frame of FIG. 3a and a portion of the main frame member, the detail having been taken as indicated in FIG. 1a.

In accordance with one or more embodiments of the present invention, an ornamental frame 50 comprises an opening 52 preferably situated centrally and is suitably sized to be received over the eyecup and the peripheral wall 34. Frame 50 preferably comprises a first material that is preferably a moldable material that is resiliently stretchable and/or compressible.

Frame 50 includes a retention portion 54 and a decorative portion 56, which includes front and rear surface 58a, 58b, respectively. Retention portion 54 preferably comprises a recess 55 that preferably mates with retention member 38 so that the decoration is retained by retention member 38 on the eyecup even when the wearer is participating in sports. Recess 55 includes a stepped shape having a support 55a that preferably matches extension dimension 38a of retention member 38 and a depth 55b that preferably matches the thickness 38b of retention member 38.

Thus, in a preferred embodiment, when retention member 38 is disposed peripherally around lens 32, recess 55 is disposed preferably around the entirety of the opening. For ease of placing the ornamental frame over the eyecup, frame 50 may comprise a rounded edge 57, which defines at least partially or wholly opening 52, and is disposed on rear surface 58b of frame 50.

Frame 50 has a width between front surface 58a and rear surface 58b that is preferably at least as large as receiving width 39a so that frame 50 is received in the receiving channel snuggly, or more preferably frame 50 has a width between front surface 58a and rear surface 58b that is larger than receiving width 39a by an excess of a dimension of the compressibility of frame 50 or an excess of a first dimension of the compressibility of frame 50 plus a second dimension of the compressibility of main frame member 14 at support 16c.

Decorative portion 56 may comprise any suitable design, but preferably is one that appeals to a child. Thus, decorative portion 56 may be reminiscent of a star and have an irregular peripheral edge 56a. However, decorative portion 56 may also comprise a regular peripheral edge 56b as illustrated in FIG. 1a. Decorative portion 56 may also comprise a texturing 60 and/or be made of a material that is luminescent.

Figure 4A:
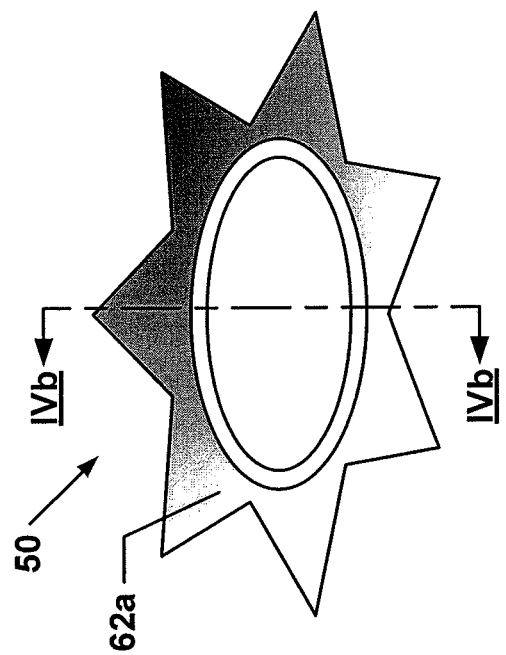
FIG. 4a is a front view of an ornamental frame in accordance with one or more embodiments of the present invention.

FIG. 4a is a front view of an ornamental frame in accordance with one or more embodiments of the present invention. FIG. 4b is a cross-sectional view of the ornamental frame of FIG. 4a. In accordance with one or more embodiments of the present invention, frame 50 or at least decorative portion 56 may comprise a translucent material. On rear surface 58b, an appliqué 62 in the form of a film, an adhesive attachment, a lasered design, or any like means may be applied or integrated with ornamental frame 50 and includes a design 62a that is visible through frame 50 to a person standing away from the wearer.

In use, a kit of customizable eyewear 10 comprising a single water protective device 12 and a plurality of ornamental frames 50 is retailed or provided in accordance with one or more embodiments of the present invention. The water protective device 12 preferably comprises a base color tone having a first color tone and the plurality of ornamental frames 50 comprise a base color tone having a second color tone that is complementary, matched, uncomplimentary, unmatched and/or in some other way interesting to the wearer or a purchaser.

In addition, the plurality of frames 50 may include many different designs of which some are identical and/or matched pairs of the same ornamental frame 50. In this manner, customizable eyewear 10 may, as illustrated in FIG. 1a, have different frames 50 mounted to provide a look that is interesting to the wearer.

A wearer or a person associated with the wearer, such as child's parent, selects one or more frames 50 for mounting from the kit, when retailed or provided as such. One or more portions of frame 50 are stretched and/or bent as required by the wearer or the person associated with the wearer to pass retention member 38 through opening 52. Frame 50 is then mounted in receiving channel 39 to dispose frame 50 against support surface 16c and a rear surface of retention member 38. To aid in the mounting, rounded edge 57 avoids snagging. The wearer or the person associated with the wearer then seats frame 50 onto water protective device 12 by adjusting frame 50 so that the retention member is received in recess 55.

Frame 50 while seated is held without play because of the peripheral frame design of frame 50 and because of contact with a uniform support from support 16c and retention member 38 being received in recess 55. However, frame 50 may also be held without play due to material choice. Thus, frame 50 comprises a first material that is resiliently compressible and main frame member 14 comprises the same or a second material that is also resilient compressible.

As frame 50 is received in channel 39, frame 50 becomes compresses as does main frame member 14 at support 16c, but retention member 38 does not since it is made from a substantially inelastic or rigid material. Therefore, frame 50 becomes, for the intended purposes of the present invention, securely wedged in receiving channel 39. Removal is substantially the reverse of the mounting.

Water protective device 12 may be configured as a swimming goggle as illustrated in the figures, but may also be configured as swimming mask or recreational snorkeling mask having a soft main frame and gasket. While a single ornamental frame 50 may be configured to be attached swimming mask or recreational snorkeling mask, a swimming goggle having separate eyecups is preferred since easier mounting of the ornamental frame, greater customizability in design due to the attachment of two ornamental frames are possible.

A customizable eyewear for use in water recreational activities includes a unitary flexible main frame member made of a thermoplastic elastomer, the main frame member includes a first and a second opening, an inner surface adjacent to the eyes of the wearer, an outer surface opposite the inner surface, and a support surface disposed on the outer surface adjacent to the respective first and second opening. A first eyecup and a second eyecup are disposed in the respective first and second opening. Each eyecup includes a retention member and a receiving channel between the retention member and the support surface, the retention member being more proximal to the outside surface than the inner surface; and at least one eyecup having an ornamental frame removably received in the respective receiving channel.

A customizable eyewear for use in water recreational activities includes a water protective device having a unitary flexible main frame member, a first eyecup, and a second eyecup that in cooperation seal a wearer's eye area from water. A first receiving channel is disposed peripherally around the first eyecup on a first outer surface of the first eyecup, a second receiving channel is disposed peripherally around the second eyecup on a second outer surface of the second eyecup. Each eyecup includes an inner space open only to an eye area of the wearer, the respective outer surface being on a surface not in contact with the inner space. An ornamental frame is removably received in the first or second receiving channel wherein the first receiving channel and the second receiving channel are not contiguous and are separated from each other.

A customizable eyewear for use in water recreational activities includes a molded unitary flexible main frame member made of a thermoplastic elastomer. The main frame member includes a left and a right portion joined by a nose bridge, an inner surface adjacent to the eyes of the wearer, and an outer surface opposite the inner surface. A pair of eyecups is disposed in the respective left and right portions and extending outward from the main frame member, respective receiving channels formed between the outer surface of the main frame member and the respective eyecup. A headstrap for securing the eyewear to the wearer, the headstrap joining respective distal ends of the left and right portions; and an ornamental frame is received in at least one receiving channel.

While the invention has been described in conjunction with specific embodiments, it is to be understood that many alternatives, modifications, and variations will be apparent to those skilled in the art in light of the foregoing description.

What is claimed is:

1. A customizable eyewear for use in water recreational activities, the eyewear comprising:
    a unitary flexible main frame member comprising a first opening, a second opening, an inner surface adjacent to the eyes of the wearer, an outer surface opposite the inner surface, and a support surface disposed on the outer surface adjacent to the respective first and second opening;
    a pair of gaskets formed on the inner surface to seal the eye areas of the wearer from water;
    a first eyecup and a second eyecup being disposed in the respective first and second opening, at least one of the first and second eyecup comprising a retention member and a receiving channel formed between a rear surface of the retention member and the support surface, the retention member being more proximal to the outside surface than the inner surface; and
    the at least one of the first and second eyecup having an ornamental frame removably received in the respective receiving channel;
    wherein the receiving channel is disposed around an entirety of a periphery of the at least one of the first and second eyecup.

2. The customizable eyewear of claim 1, wherein the ornamental frame comprises a stepped recess for receiving the respective retention member.

3. The customizable eyewear of claim 1, wherein the ornamental frame comprises a textured surface.

4. The customizable eyewear of claim 1, wherein the ornamental frame comprises a first resiliently compressible material and the main frame member includes a second resiliently compressible material.

5. The customizable eyewear of claim 1, wherein the support surface is substantially planar.

6. The customizable eyewear of claim 5, wherein the support surface is disposed peripherally around the respective eyecup.

7. The customizable eyewear of claim 1, wherein the first eyecup or the second eyecup comprises an extended shape having an inner space and a lens distal disposed forward of the outer surface of the main frame member.

8. The customizable eyewear of claim 1, wherein the first eyecup or the second eyecup comprises a lens, the ornamental frame comprises a front surface, the lens and the front surface being disposed in substantially the same plane.

9. The customizable eyewear of claim 1, wherein the first eyecup or the second eyecup comprises a lens and a wall perpendicular to the lens that disposes the lens distal from the main frame member.

10. A customizable eyewear for use in water recreational activities, the eyewear comprising:
   a water protective device comprising a unitary flexible main frame member, a first eyecup, and a second eyecup that in cooperation seal a wearer's eye area from water;
   a pair of gaskets formed on an inner surface of the main frame member to seal the eye areas of the wearer from water;
   a first receiving channel disposed around an entirety of a periphery of the first eyecup on a first outer surface of the first eyecup, a second receiving channel disposed around an entirety of a periphery of the second eyecup on a second outer surface of the second eyecup, each of the first and second eyecup comprising an inner space open only to an eye area of the wearer, the respective outer surface being on a surface not in contact with the inner space; and
   an ornamental frame removably received in the first or second receiving channel;
   wherein the first receiving channel and the second receiving channel are not contiguous and are separated from each other.

11. The customizable eyewear of claim 10, wherein at least one eyecup comprises a lens and a wall angled from the lens.

12. The customizable eyewear of claim 10, wherein the eyecups are received in respective receiving grooves of the main frame member.

13. The customizable eyewear of claim 10, wherein at least one eyecup comprises a lens and a retention member disposed peripherally around the lens, the retention member forming a side of the receiving channel.

14. The customizable eyewear of claim 10, wherein at least one eyecup comprises a lens and a retention member disposed in the same plane as the lens, the retention member forming a side of the receiving channel.

15. The customizable eyewear of claim 10, further comprising a support surface of the main frame member disposed peripherally around at least one eyecup.

16. The customizable eyewear of claim 10, wherein the ornamental frame comprises a stepped shape for receiving a retention member of at least one eyecup.

17. A customizable eyewear for use in water recreational activities, the eyewear comprising:
   a molded unitary flexible main frame member comprising a left portion and a right portion joined by a nose bridge, an inner surface adjacent to the eyes of the wearer, and an outer surface opposite the inner surface;
   a pair of eyecups disposed in the respective left and right portions and extending outward from the main frame member, respective receiving channels formed between the outer surface of the main frame member and the respective eyecup, each respective receiving channel extending entirely around a periphery of the respective eyecup;
   a pair of gaskets formed on the inner surface to seal the eye areas of the wearer from water;
   a headstrap for securing the eyewear to the wearer, the headstrap joining respective distal ends of the left and right portions; and
   an ornamental frame received in at least one of the receiving channels.

18. The customizable eyewear of claim 17, wherein each eyecup comprises a lens and a retention member disposed in the same plane as the lens, the retention member forming a side of the respective receiving channel.

19. The customizable eyewear of claim 18, wherein the ornamental frame comprises a stepped shape for receiving a respective retention member.

* * * * *